Feb. 11, 1936. O. SCHWIMMER 2,030,158
DEVICE FOR MAKING CREAM
Filed Dec. 28, 1931
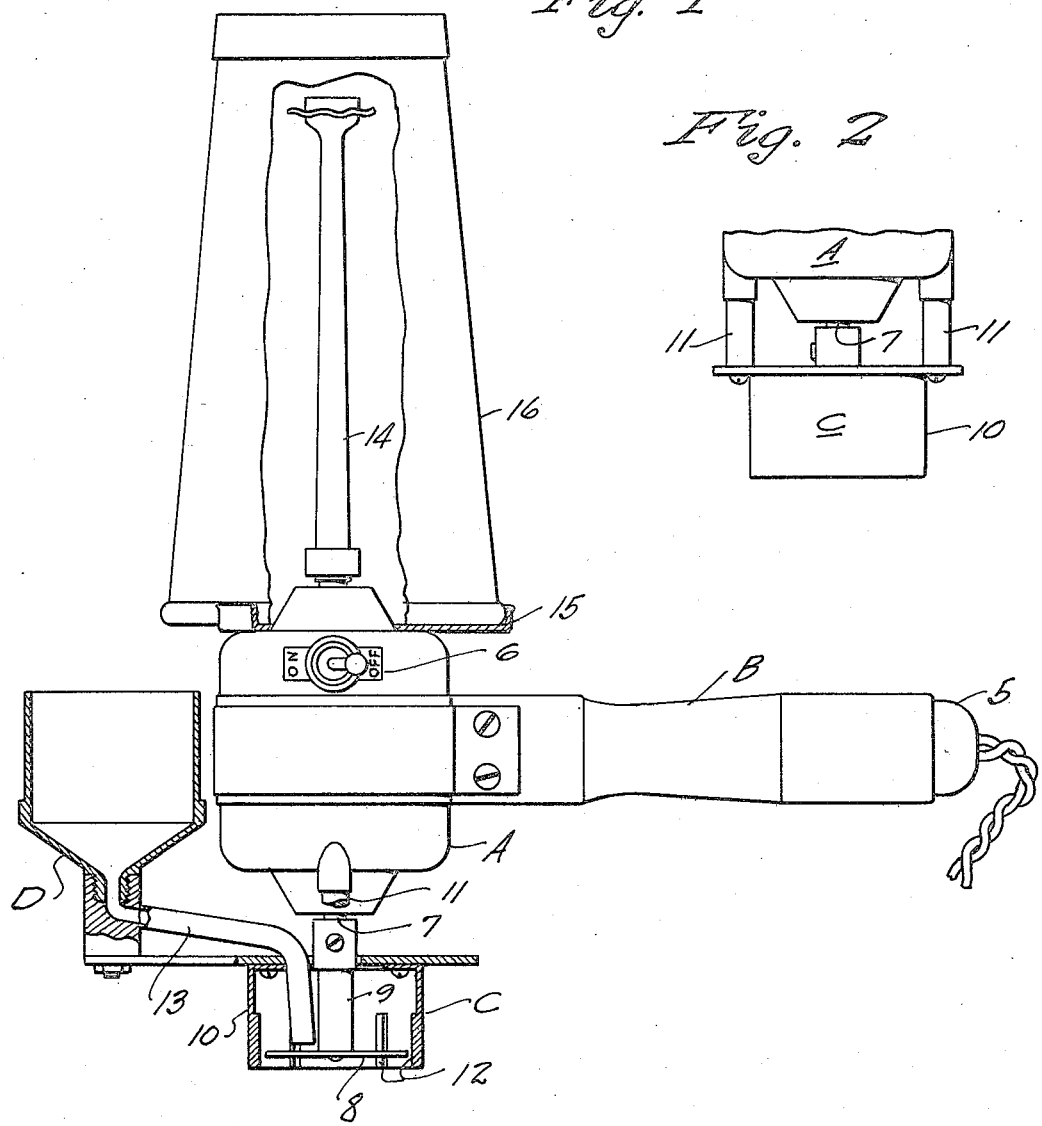
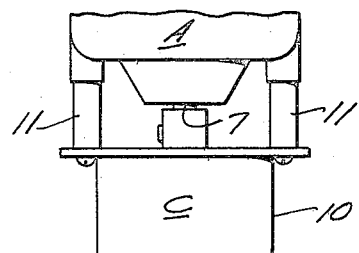
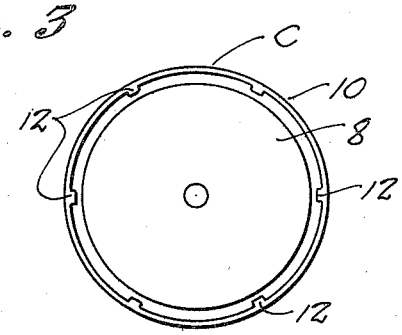
INVENTOR
Oscar Schwimmer
BY Ernest L. Wallace
ATTORNEY Patented Feb. 11, 1936

2,030,158

UNITED STATES PATENT OFFICE 2,030,158

DEVICE FOR MAKING CREAM

Oscar Schwimmer, Los Angeles, Calif.

Application December 28, 1931, Serial No. 583,429

4 Claims. (Cl. 259—10)

This invention relates to a device for producing an aqueous emulsion carrying oleaginous globules dispersed throughout emulsion. A specific use is for producing cream from butter and milk. Cream is commonly graded according to its butter fat content and the greater the butter fat content the richer is the cream. Since commercially only a limited amount of rich cream is available and the demand for such cream is not great, means for producing as desired a rich cream is advantageous. The present machine has for its primary object the provision of a device for producing an emulsion of an aqueous liquid having oleaginous globules dispersed therein to produce an emulsion of any degree of richness desired. As illustrative of a specific emulsion, sweet butter may be mixed with milk and dispersed in globules therethrough to produce a uniform cream emulsion corresponding to cream of the degree of richness desired.

The present machine contemplates a rotary impelling disk and a collector against which the impelled mixture is projected to produce a homogeneous emulsification, a breaking up of the butter fat into globules and suspension in the emulsion. It is a primary object of this invention to produce a machine having a minimum of parts, simple in structure, having no metal parts in frictional relation in contact with the liquid to be treated and hence no metal particles to go into solution, capable of sterilization, and efficient in operation. These objects are attained by means of the embodiment of my invention illustrated in the accompanying drawing, in which:

Fig. 1 is an elevation partly in section of a combined cream preparer and stirrer; Fig. 2 is a fragmentary elevation showing the collector; and Fig. 3 is a bottom plan view of the assembled impeller and collector.

Referring more particularly to the drawing, the invention is shown embodied in a portable unit suitable for household use. It comprises a motor housing A to which a handle B is attached. The motor contained within housing A is an electric motor of a conventional type having a shaft overhanging both ends of the housing. An emulsifier and mixer C is secured to one side of the housing A. Secured to the housing is a supply container D in which an initial mixture of butter fat and milk is placed.

The handle B serves as a conduit for the leads of the motor, having a socket for receiving a plug 5 for connection to an electrical service system. On the housing a switch 6 is shown to control the motor.

The armature shaft 7 is extended on one side and secured thereto is an impeller disk 8 having a hub sleeve 9 receiving the shaft. Surrounding the disk 8, spaced therefrom and closely adjacent the periphery is a collector shell 10 closed at its upper end by a plate and supported from housing A by pillars 11. The shell 10 overhangs disk 8 and on its inner wall is provided with ribs 12 forming riffles. Extending from the bottom of the container D is a tube 13 which ends short of the face of disk 8.

In the operation of the device, the unit is held with the shell depending vertically and preferably disposed within some receiving container. The motor is placed in operation causing the disk 8 to rotate at a high speed. Sweet butter and milk are mixed and preferably warmed to increase the fluidity and poured into the container D. The mixture of milk and butter fat is delivered to the upper face of disk 8 and impelled outwardly toward its periphery in a thin film. This action is due to the viscosity of the mixture. Obviously, the film is attenuated as it moves toward the periphery of the disk creating a surface tension which aids in emulsification and also tending to attenuate the particles of butter fat. The mixture is projected from the periphery of the disk, striking the closely adjacent wall of the collector 10, the impact aiding emulsification and also breaking up the fat particles, and arresting separation due to centrifugal force, the ingredients having various specific gravities. The ribs 12 impede revolution of the projected mixture and cause further emulsification and mixing. It will be noted that the ribs 12 are rectangular in cross section with sharp edges in the direct path of the mixture impelled from the disk causing a cutting action and further breaking up the butter fat. The emulsified mixture then flows downwardly from the shell and is received in the receiving container. If found desirable, the mixture may be returned to the container D and retreated. This may be done as many times as found desirable.

The unit is capable of being used as a mixer, a stirrer 14 having a shaft which may be slipped upon motor shaft 7 provides a unit such that the stirrer may be placed in a vessel and used in the manner common in making beverages. A lid 15 is shown mounted on housing A and having a lip to receive the rim of a container 16. In the use of the unit as a stirrer it is inserted from the position shown in Fig. 1.

What I claim is:—

1. A device for emulsifying an aqueous liquid and dispersing therein oleaginous globules comprising a rotary disk having an uninterrupted flat upper face, means to rotate said disk, means to feed a mixture of oleaginous matter and said liquid to a small area of said face whereby the disk centrifugally impels the mixture in a film by the viscous contact of said mixture therewith and discharges it from its periphery, and a shell encompassing and closely adjacent the periphery of said disk for impact of the impelled mixture thereagainst and its collection, the faces of said disk being free of any proximate confronting surfaces, the peripheral space between said disk and wall constituting an unimpeded discharge opening for immediate discharge of the emulsion.

2. A device for emulsifying an aqueous liquid and dispersing therein oleaginous globules comprising a rotary disk having an uninterrupted flat upper face, means to rotate said disk, means to feed a mixture of oleaginous matter and said liquid to a small area of said face whereby the disk centrifugally impels the mixture in a film by the viscous contact of said mixture therewith and discharges it from its periphery, and a collector shell open ended with respect to the faces of said disk, spaced from and closely adjacent the periphery of said disk for impact of the impelled mixture thereagainst and its collection, the peripheral space between said disk and shell constituting an unimpeded discharge opening for immediate discharge of the emulsion.

3. A device for emulsifying an aqueous liquid and dispersing therein oleaginous globules comprising a rotary disk having an uninterrupted flat upper face, means to rotate said disk, means to feed a mixture of oleaginous matter and said liquid to a small area of said face whereby the disk centrifugally impels the mixture in a film by the viscous contact of said mixture therewith and discharges it from its periphery, and a shell encompassing and closely adjacent the periphery of said disk for impact of the impelled mixture thereagainst and its collection, said shell being open ended with respect to the faces of said disk and having means to impede revolution of the impelled mixture about the axis of said disk, the peripheral space between said disk and wall constituting an unimpeded disk and discharge opening for immediate discharge of the emulsion.

4. A device for making cream from milk and butter fat comprising a rotary disk having an uninterrupted flat upper face, means to rotate said disk, a container for a mixture of milk and butter fat, a tube extending from said container to feed a mixture of milk and butter fat to said face whereby the disk centrifugally impels the mixture in a film by the viscous contact of said mixture therewith and discharges it from its periphery, and a collector shell having open ends with respect to the faces of said disk, spaced from and closely adjacent the periphery of said disk for impact of the impelled mixture thereagainst and its collection, said shell having riffles of rectangular cross section extending transverse to the path of rotation of said disk for impeding revolution of the impelled mixture and having sharp corners in the direct path of the impelled mixture to cause a cutting action and further induce emulsification.

OSCAR SCHWIMMER.